(12) United States Patent
Daveloose et al.

(10) Patent No.: US 9,945,500 B2
(45) Date of Patent: Apr. 17, 2018

(54) FLEXIBLE PIPE FOR TRANSPORTING FRESH WATER, SET FOR THE STORAGE THEREOF AND ASSEMBLY OF A PLURALITY OF PIPES

(71) Applicant: BBLM Associes, Sceaux (FR)

(72) Inventors: Frank Daveloose, Verviers (BE); Claude Lebelle, Croissy sur Seine (FR); Gilbert Mayor de Montricher, Paris (FR)

(73) Assignee: BBLM ASSOCIES, Sceaux (FR)

( * ) Notice: Subject to any disclaimer, the term of this patent is extended or adjusted under 35 U.S.C. 154(b) by 222 days.

(21) Appl. No.: 14/892,905

(22) PCT Filed: Apr. 10, 2014

(86) PCT No.: PCT/FR2014/050877
§ 371 (c)(1),
(2) Date: Nov. 20, 2015

(87) PCT Pub. No.: WO2014/188095
PCT Pub. Date: Nov. 27, 2014

(65) Prior Publication Data
US 2016/0109041 A1    Apr. 21, 2016

(30) Foreign Application Priority Data

May 22, 2013 (FR) .................... 13 54614

(51) Int. Cl.
*F16L 11/00* (2006.01)
*F16L 11/04* (2006.01)
(Continued)

(52) U.S. Cl.
CPC ............ *F16L 11/04* (2013.01); *B32B 1/08* (2013.01); *B32B 5/022* (2013.01); *B32B 5/024* (2013.01);
(Continued)

(58) Field of Classification Search
CPC .................. F16L 11/04; B32B 1/08
(Continued)

(56) References Cited

U.S. PATENT DOCUMENTS

| 1,053,933 A | * | 2/1913 | Stowe | ............ B65B 7/14 138/119 |
| 1,100,829 A | * | 6/1914 | Joseph | ............ B65B 7/14 138/119 |

(Continued)

FOREIGN PATENT DOCUMENTS

| EP | FR 2 254 746 | 7/1975 |
| EP | 0337037 | 10/1989 |

(Continued)

OTHER PUBLICATIONS

PCT/FR2014/050877 International Search Report dated Jun. 26, 2014 (8 pages).

(Continued)

*Primary Examiner* — Vishal Pancholi
(74) *Attorney, Agent, or Firm* — Brinks Gilson & Lione; G. Peter Nichols

(57) ABSTRACT

A flexible pipe suitable for transporting fresh water is described. The pipe has a circular cross-section when it is pressurized and which can collapse in on itself. The pipe has an outer diameter of between 1 and 7 meters and a length of between 200 and 3000 meters and includes an envelope which is sealed from the transported liquid, and at least two peripheral reinforcing elements increasing the mechanical resistance of the pipe to a positive differential pressure so that the pipe can support a positive differential pressure of between 1 and at least $10 \times 10^5$ Pa without bursting or cracking.

14 Claims, 4 Drawing Sheets

Figure 1:
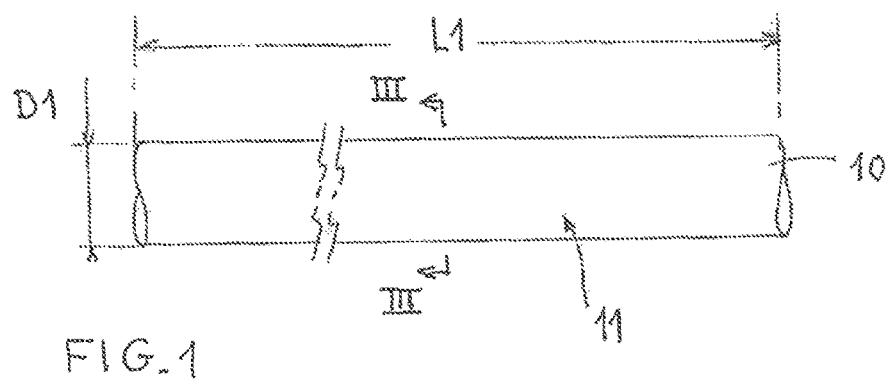

(51) Int. Cl.
*F16L 11/02* (2006.01)
*F16L 11/08* (2006.01)
*F16L 47/02* (2006.01)
*B32B 5/02* (2006.01)
*B32B 5/10* (2006.01)
*B32B 5/12* (2006.01)
*B32B 5/26* (2006.01)
*B32B 27/08* (2006.01)
*B32B 1/08* (2006.01)
*F16L 57/02* (2006.01)
*B29D 23/00* (2006.01)

(52) U.S. Cl.
CPC ............... *B32B 5/026* (2013.01); *B32B 5/10* (2013.01); *B32B 5/12* (2013.01); *B32B 5/26* (2013.01); *B32B 27/08* (2013.01); *F16L 11/02* (2013.01); *F16L 11/087* (2013.01); *F16L 11/088* (2013.01); *F16L 47/02* (2013.01); *F16L 57/02* (2013.01); *B29D 23/001* (2013.01); *B32B 2260/023* (2013.01); *B32B 2260/046* (2013.01); *B32B 2597/00* (2013.01); *F16L 11/042* (2013.01)

(58) Field of Classification Search
USPC .................................. 138/119, 124, 125, 129
See application file for complete search history.

(56) References Cited

U.S. PATENT DOCUMENTS

| | | | | |
|---|---|---|---|---|
| 3,374,806 | A * | 3/1968 | Skinner | F16L 11/121 138/119 |
| 3,467,013 | A | 9/1969 | Conner | |
| 3,856,052 | A * | 12/1974 | Feucht | F16L 11/083 138/119 |
| 3,915,618 | A * | 10/1975 | Feucht | B29C 49/0015 156/156 |
| 3,918,782 | A | 11/1975 | Allmand | |
| 6,926,037 | B2 | 8/2005 | Tan | |
| 7,640,950 | B2 * | 1/2010 | Tan | F16L 9/133 138/118 |
| 2004/0112452 | A1 | 6/2004 | Tan | |
| 2011/0041991 | A1 | 2/2011 | Thomasset | |
| 2012/0118397 | A1 | 5/2012 | Novotny | |
| 2015/0010360 | A1 | 1/2015 | Lebelle | |

FOREIGN PATENT DOCUMENTS

| | | |
|---|---|---|
| FR | 2 786 246 | 5/2000 |
| FR | 2 983 934 | 6/2013 |
| GB | 1452850 | 10/1976 |
| GB | 2 254 063 | 9/1992 |
| GB | 2 327 997 | 2/1999 |
| WO | WO 03/081105 | 10/2003 |
| WO | WO 2009/125330 | 10/2009 |

OTHER PUBLICATIONS

Author: Boglilo, "Transportation of fresh water in large quantities and over long distances by underwater flexible pipeline", Internet citation, URL: http://www.semide.net/media_server/files/N/7/via-marina_presentation.pdf, Feb. 27, 2009, XP055035510.

Author: Via Marina, "Submariver® Transportation of water in large quantities and over long distances by underwater flexible pipe", Internet citation, URL: http://www.via-marina.com/fr/film.php?lang=gb, Jun. 14, 2011, XP054975243.

* cited by examiner

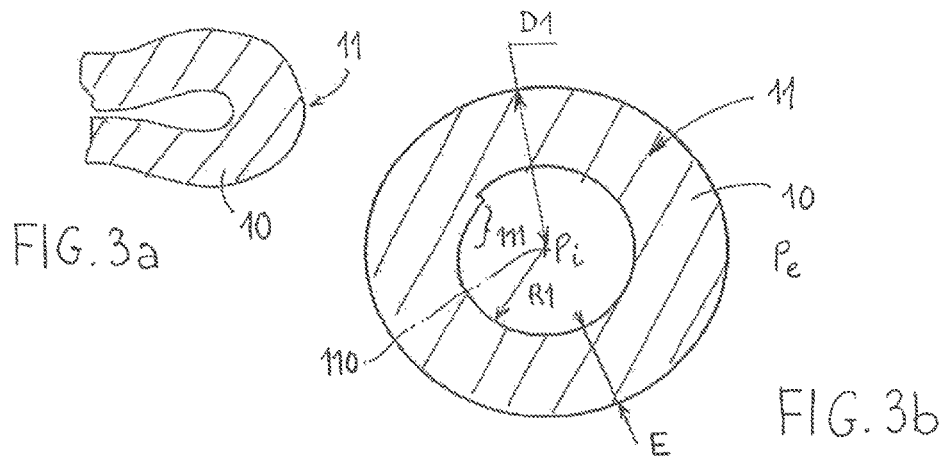
FIG. 3a
FIG. 3b
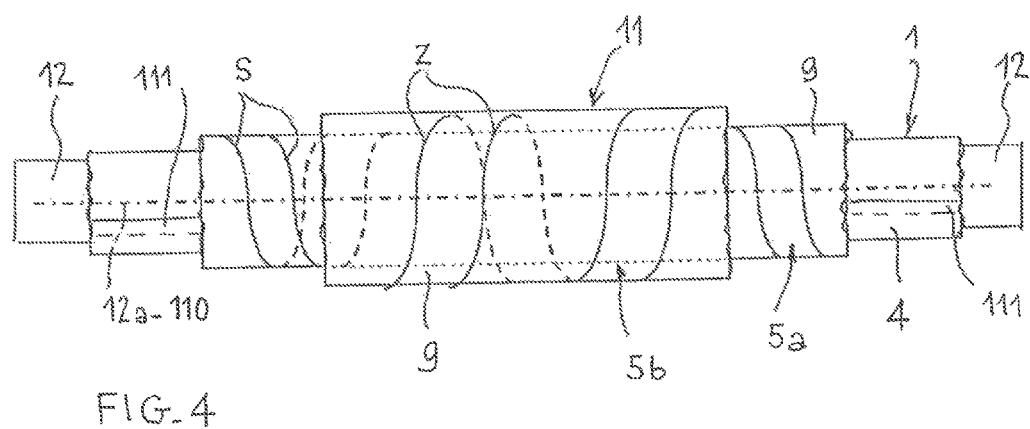
FIG. 4
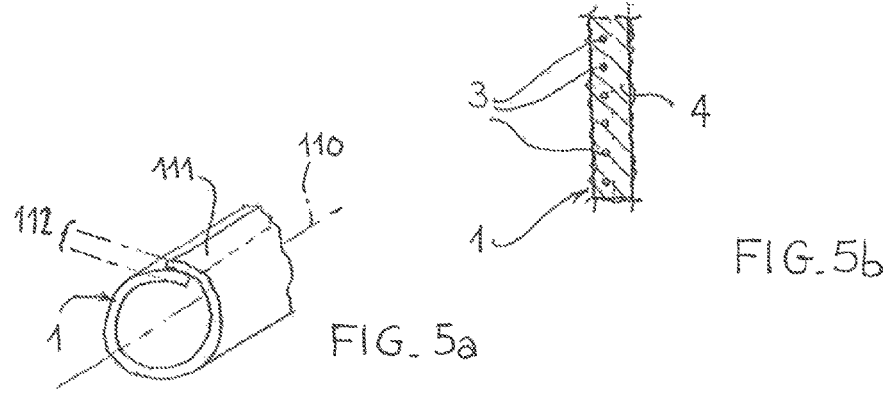
FIG. 5a
FIG. 5b

FLEXIBLE PIPE FOR TRANSPORTING FRESH WATER, SET FOR THE STORAGE THEREOF AND ASSEMBLY OF A PLURALITY OF PIPES

This application claims priority to International Application No. PCT/FR2014/050877 filed Apr. 10, 2014 and to French Application No. 1354614 filed May 22, 2013; the entire contents of each are incorporated herein by reference.

This concerns a flexible pipe elongated along an axis, adapted to transport fresh water, able to be wound longitudinally onto a drum or folded into a container, longitudinally continuous, of circular section when it is subject to a positive differential pressure between the interior of the pipe and the exterior and the section of which can be crushed on itself by the effect of a negative differential pressure.

In accordance with the common definition, a pipe is here a flexible line of closed section.

Apart from the specific ability to transport fresh water, its diameter, its length and to be wound longitudinally onto a drum or folded into a container, a pipe crushable on itself is described in U.S. Pat. No. 6,926,037.

A problem exists, taken into account here, of a compromise between the weight of the pipe, its manoeuvrability (storage, movement, curvature, etc.), its cost of manufacture/use, its ability to transport large quantities of fresh water (flowrate) and its mechanical strength (resistance to pressure, to folding, to tearing, etc.), with the advantage of not having to manage the problem of the corrosion of the wall(s) of the pipe by the fluid transported.

In this respect, the massive supply of fresh water, in a manner that is economically viable and ecologically acceptable, is at this time a major problem, as yet unsolved. The pipe described here must be an essential link enabling supply of fresh water to coastal regions at costs making it possible to envisage agricultural use and without notable action on the ecology of the hydrological basins.

To this end, it is proposed that the pipe have an outside diameter between 1 and 7 meters inclusive and a length between 200 and 3000 meters inclusive and comprise an envelope impermeable to the transported liquid as well as at least two peripheral reinforcing elements increasing the mechanical resistance of the pipe to a positive differential pressure and that withstands without bursting or splitting a positive differential pressure from 1 to at least 10 bar.

This must make it possible to withstand laying it, if necessary partly on land, partly immersed (typically in a marine environment), on seabeds that may be mechanically aggressive, from storage drums (wound solution) or containers (folded solution), and at depths of immersion that can exceed 100 meters or even 1000 meters.

To favour the required strength, it is recommended that the envelope and the reinforcing elements be made from at least one thermoplastic material reinforced by filaments so that the pipe includes, in section, from the interior toward the exterior:
- a first textile layer of knitted, braided, woven or non-woven structure, having longitudinal filaments parallel to the longitudinal axis of the pipe, then, around said first textile layer,
- at least one second then one third textile layers each:
  - of knitted, braided, woven, non-woven or unidirectional structure,
  - wound longitudinally in a helix along the axis of the pipe, and
  - including longitudinal filaments parallel to the generatrix of the helix.

This must in particular combine impermeability, controlled weight, resistance to pressure, to folding, to tearing.

To provide a pipe diameter between 1 and 5 meters inclusive and preferably (for a flowrate/mass per linear meter/pressure resistance compromise) 4 to 5 meters (to within 20%), that will moreover make possible a workable compromise between flowrate, mechanical strength and storage.

To provide a pipe length between 300 and 1000 meters inclusive diameter will moreover make possible a workable compromise between storage, rapidity of deployment (fewer butt-jointing zones between two successive lengths than with shorter lengths), weight of the winding drums or of the folding containers enabling handling thereof by cranes on or between surface ships, at sea.

Same last advantage with a pipe having a mass per linear meter between 14 kg/ml and 320 kg/ml inclusive depending on the diameter and the bursting pressure, then furthermore with a compromise between weight (ballast on immersion from the surface ship concerned on which pipe is then disposed) and mechanical strength.

In the same way, the mechanical resistance to crushing and to curvatures, twisting or bending suffered during storage or during handling, notably laying, moreover lead to recommending that
- the denier of the longitudinal filaments is between 200 and 8500 Tex inclusive, and
- the number of these longitudinal filaments is less than three filaments per cm.

In effect, when a pipe is installed in the open air, the absence of exterior pressure enables use of such a pipe with flexible wall(s), the interior operating pressure remaining greater than the ambient atmospheric pressure. When a pipe of this kind is to be installed on the seabed, the internal pressure of the transported fluid must make it possible for the section of the pipe to remain open. Under these conditions, it is not necessary to use a structure resistant to the external pressure, the latter being counterbalanced by the internal pressure. On the other hand, the structure of the pipe must be resistant to the maximum internal service pressure of the installation and should preferably be self-supporting during its installation.

By avoiding having to resist crushing caused by exterior loads, expenditure on material is avoided and this results in a more economical structure, by virtue of the range of masses per linear meter that can be achieved.

The above advantages are also achieved by providing that:
- the thickness of the tubular wall (of closed section) of the pipe is between 6 and 17 millimeters inclusive depending on the diameter and the bursting pressure, and/or
- the following inequality is respected:

$$\frac{T}{P} \leq \mu \pi R^2$$

with: $\mu = 0.9$

T: axial breaking tension at zero differential pressure,
P: bursting differential pressure (Pi–Pe) between the interior and the exterior of the pipe, with Pi: internal pressure of the pipe and Pe: external pressure,
R: inside radius of the pipe under positive differential pressure.

For a compromise between price, weight, flexibility and mechanical strength it is recommended that the bursting pressure of the pipe be between 3 and $30 \times 10^5$ Pa inclusive.

To the same end, it is moreover recommended that the pipe be:

deformable between a circular internal section and a flattened internal section in which two opposite zones of the internal perimeter touch each other, and foldable on itself longitudinally to form a flattened strip having, at the location of the folds, a radius of curvature less than or equal to 50 cm, without the bursting pressure or the axial breaking tension under zero differential pressure of the pipe being modified more than 5%, by the passage from the circular internal section to the flattened internal section and vice versa, and by the folding of the pipe longitudinally on itself, to form said flattened strip, and unfolding it flat.

Also concerned is, apart from the pipe, a system in accordance with any one of the following three solutions that enable rapid operational use of the pipe, without risk of it being damaged during its storage, this system comprising:

a length of the pipe having some or all of the foregoing features, and a drum around which said length is wound, flat or in a state immediately close to such a flat state, not folded on itself perpendicularly to its longitudinal axis, the drum having a width oriented perpendicularly to the longitudinal axis of said length of pipe, this width being greater than the half-perimeter of the pipe in a circular state of the section of this pipe, or:

a length of the pipe having some or all of the foregoing features, and a drum around which said length is wound, with its section flattened, folded on itself perpendicularly to its longitudinal axis, the drum having a width oriented perpendicularly to the longitudinal axis of said length of pipe, this width being less than the half-perimeter of the pipe in a circular state of the section of this pipe, or:

a length of the pipe having some or all of the foregoing features, and a container in which the pipe is accordion-folded.

Also concerned is the assembly of a plurality of pipes having some or all of the foregoing features butt-jointed two by two at the location of a welding zone where at least some of the aforementioned thermoplastic materials of the pipes are fused.

Figure 2:
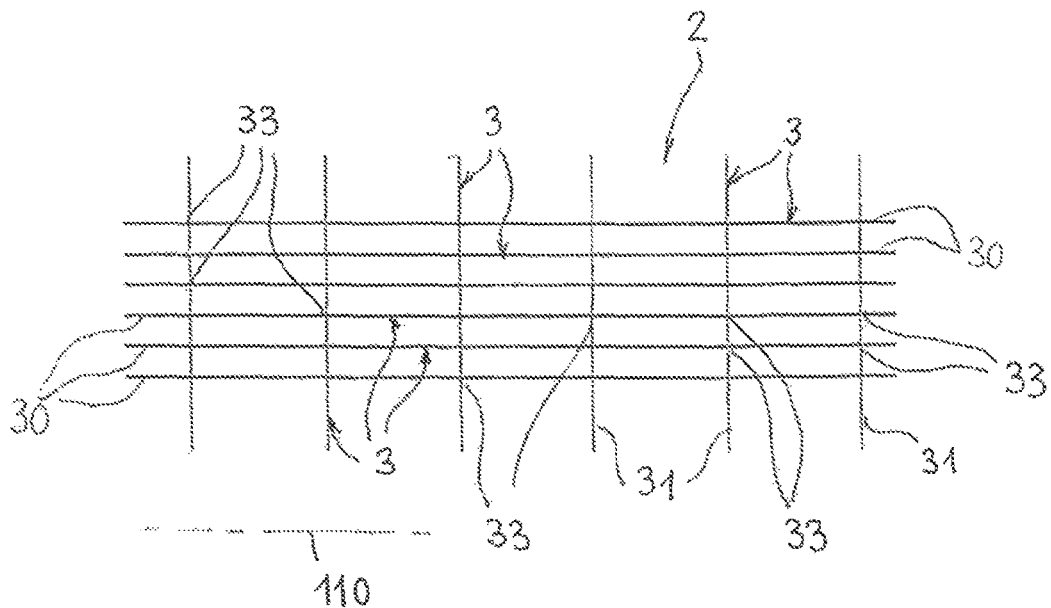
Figure 6:
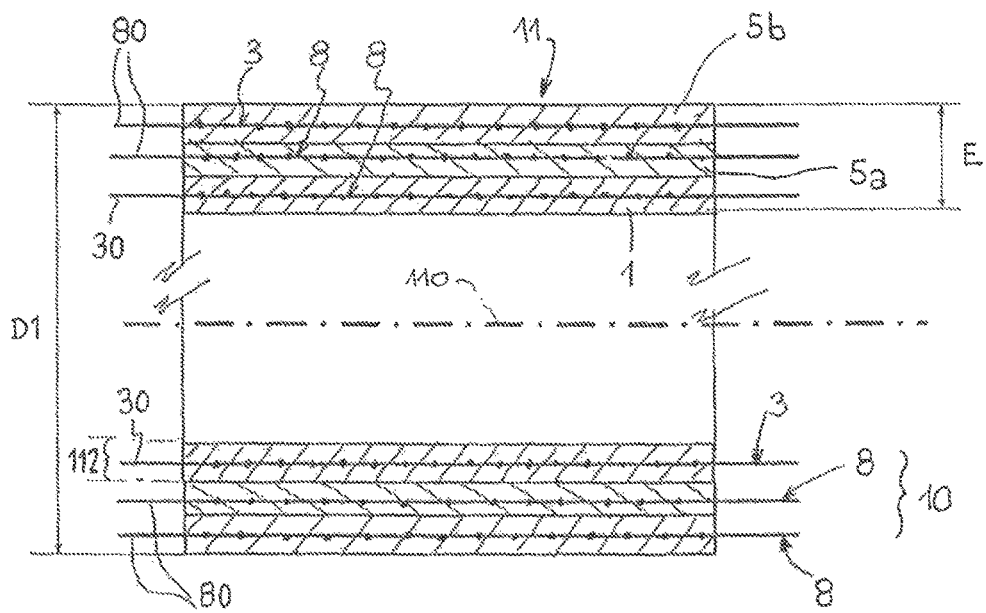
Figure 7:
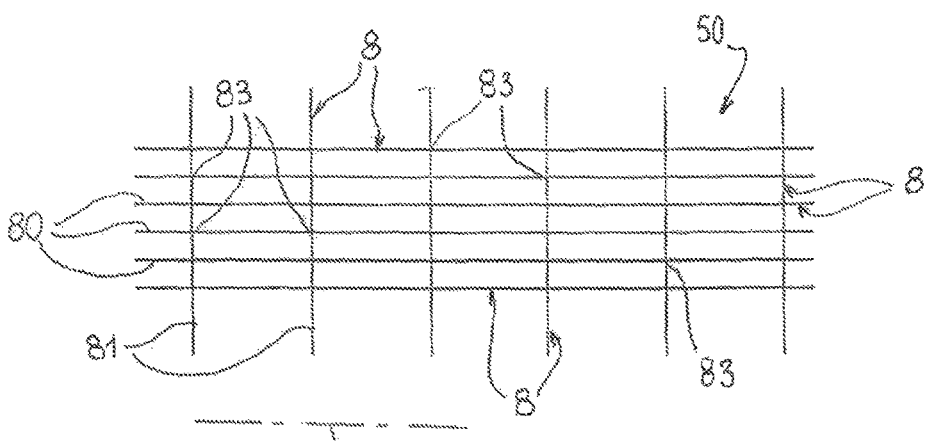
Figure 8A:
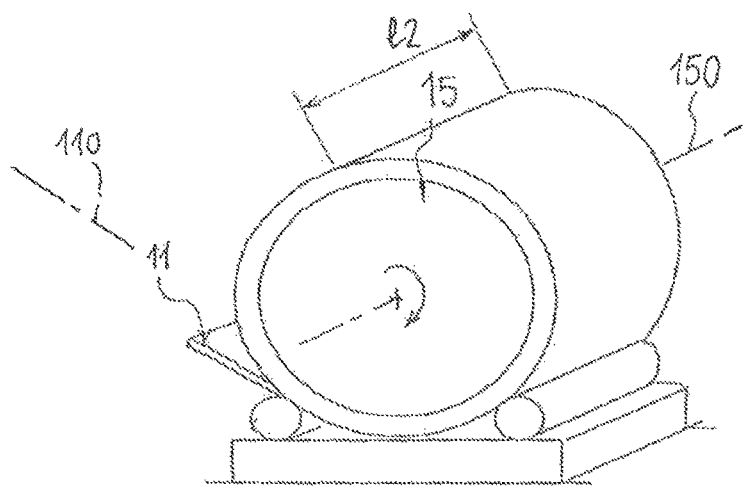
Figure 8B:
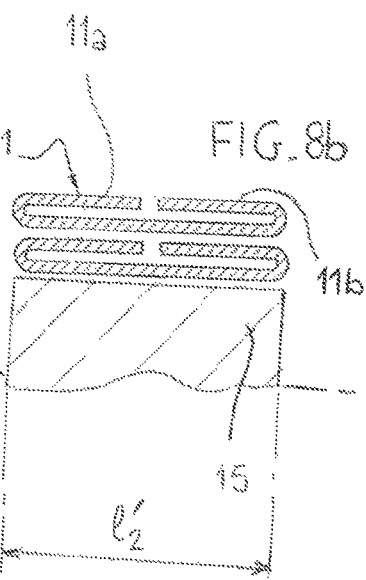
Figure 9:
Figure 10:
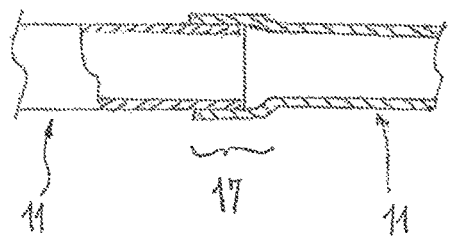

There follows a description of the figures provided, like the following description, by way of examples of possible embodiment(s):

FIG. 1: diagrammatic side view of the pipe,

FIG. 2: filaments reinforcing the knitted, braided, woven or non-woven base 2 of the coated fluid-tight textile structure 1 of the pipe, FIGS. 3a, 3b: sections III-III of the pipe from FIG. 1, respectively in states crushed on itself and under pressure (round); the reinforcing filaments are not shown, FIG. 4: diagrammatic side view of the pipe, with its various concentric layers and the optional manufacturing central mandrel, FIGS. 5a, 5b: partial sections in perspective and section, respectively, of the coated fluid-tight textile structure 1 of the pipe, FIG. 6: longitudinal section of a length of the pipe 11, FIG. 7: filaments reinforcing the knitted, braided, woven or non-woven base 50 of the layers 5a, 5b reinforcing the pipe, FIGS. 8a, 8b: pipe 11 wound around a storage/handling drum, in accordance with two alternative winding modes, FIG. 9: pipe 11 accordion-folded in a storage/handling container, FIG. 10: pipes 11 butt-jointed, coaxially, with partial longitudinal nesting.

The wall 10 of closed section of the pipe 11 has a coated fluid-tight textile structure 1 consisting of a knitted, braided, woven or non-woven base 2 incorporating longitudinal reinforcing filaments 3 (see FIGS. 1, 2, 7 in particular). Each width produced in this way is then coated with a thermoplastic material 4 on its two faces in order to render it impermeable to the transported fluid and to the surrounding fluids (seawater in particular); see FIG. 4.

For its manufacture, it is recommended that the coated fluid-tight textile structure 1 is produced flat, as a strip, and then conformed into a tube and heat-welded longitudinally. There will then favourably be overlapping 111 of the (longitudinal) edges along at least one generatrix; see FIG. 5a. This improves the mechanical strength and makes the fluid-tightness more secure.

Around it, this coated fluid-tight textile structure is reinforced by the application of two or more than two such layers 5a, 5b each consisting of reinforcing tapes applied in helixes (S and Z) crossing at a specified angle; see FIG. 4.

The reinforcing tapes 5a, 5b consist of high-strength helicoidal reinforcing filaments 8 embedded in a matrix 9 consisting of the same thermoplastic material as the fluid-tight textile structure 4 or a thermoplastic material compatible with the latter to be fused with it; see FIGS. 4, 6, 7.

It is recommended that the reinforcing tapes 5a, 5b be fixed to (around) the coated fluid-tight textile structure 1 by heat-welding so as to cause the thermoplastic materials 4 and 9 of the surfaces in contact to fuse together and thereby to form a tubular structure reinforced by high-strength filaments in crossed helixes. The angle of the helixes is measured between the direction of the reinforcing tape and the direction perpendicular to the axis of the tube.

The pertinent choice of the thermoplastic materials 4 and 9 of the coated fluid-tight textile structure and the reinforcing filaments 3, 8 makes it possible to produce an assembly of the various elements by fusion of the layers in contact without the constituents 1, 2, 3, 4, 8 being chemically or mechanically affected.

The judicious choice of the various geometrical parameters makes it possible to constitute a structure resistant to a specified internal pressure and to a specified pure axial tension without increasing the quantity of reinforcing filaments necessary relative to the single case of resistance to the internal pressure.

Within each textile structure, the reinforcing filaments 3, 8 will preferably comprise, for balancing and controlling stresses, warp and weft filaments 30, 31 and 80, 81, respectively; see FIGS. 2, 7. It is recommended that respective filaments 33, 83 connect the two layers at each intersection of the warp and the weft. These binding filaments 33, 83 between warp and weft are shown in FIGS. 2, 7 in which only these warp and weft filaments are shown. The textile bases used for the water chamber and the helical tapes will preferably be the same, only the characteristics of the warp and weft filaments, their denier and their gauge then changing. The textile layer may also include no weft filaments.

Up to a pressure difference between the interior (Pi) and the exterior (Pe) of the pipe 11 of 30 bars ($30 \times 10^5$ Pa), a structure of the foregoing type is liable to collapse (to be crushed on itself, in section; cf. FIG. 3a) without being damaged if the exterior pressure that is applied to it is greater than the pressure of the fluid (typically water) situated in the interior of the flexible pipe.

To be precise, this collapse is a buckling of the wall in the strength of materials sense and depends essentially on the geometry and the moduli of elasticity of the materials employed. It is generally found that the resistance to collapse requires significantly more material for the external pressure resistance of the pipe than for the resistance to the internal pressure (Pi).

The structure adopted makes it possible to envisage continuous, and no longer discrete, production and allows great lengths of flexible pipe in one piece, from 500 meters to several kilometers depending on the diameter and the working pressure and the conditions applying to the transportation of the product.

For ease of handling during terrestrial transportation and during installation at sea there is recommended a length of pipe in one piece between 300 and 700 meters inclusive.

To this end, the tube passes around a circular mandrel 12 (FIG. 4) around which tape applicators will apply the tapes 5a, 5b in helixes crossing at said specified angle. The pipe 11 produced in this way is flexible and can be wound flat or folded, with lateral flaps, onto a drum 15, or folded, preferably in alternating layers (accordion fold), in a container 16; see FIGS. 8, 9.

In accordance with this manufacturing process, the pipe 11 retains its orientation on the mandrel as it advances along its axis. The drums that deliver the reinforcing strips are disposed on a support that turns about the axis of the pipe. Production can therefore be freed of the necessity to have the tube turn on its axis during the application of the reinforcing tapes and this makes it possible to circumvent corresponding length limitations.

The long flexible pipe 11 that is the subject matter of the present invention can be used as a conventional line between departure and arrival points for the transportation of a particular fluid. This flexible pipe may be placed in the open air, laid on a foundation or immersed in a fluid (typically seawater) at a pressure lower than the working pressure of the pipeline, therefore maintaining its section circular. Depending on the mass per unit volume of the exterior fluid, the line is laid on or retained by its foundation.

The pipe 11 is susceptible to industrial application to the transport of fresh water in a marine environment. If it is required to transport water from a water intake on land between two points of a marine coast, this long flexible pipe can be installed on the seabed with an appropriate system of foundations making it possible to resist hydrodynamic and seismic forces and therefore making it possible to transport large quantities of fresh water between two zones.

Also possible is the transfer of fresh water between basins by canals on land in order to avoid high losses linked to infiltration into the ground and to evaporation from the free surface exposed to the open sky in hot and dry regions where evaporation is high. The flexible pipe 11 can then also be inserted into the bottom of one of these canals to enable transportation of water without exposing its free surface, which prevents any evaporation or infiltration during transport.

As shown, the pipe 11 obtained is therefore elongate along the axis 110, flexible and able to transport fresh water.

It can therefore be wound longitudinally onto a drum or folded, preferably accordion-folded, into a container.

It is longitudinally continuous and of circular section when it is subjected to a positive differential pressure between the interior and the exterior, its closed section being crushable on itself by the effect of a negative differential pressure.

By way of noteworthy characteristics, there have already been noted:
- an outside diameter D1 between 1 and 7 meters inclusive and a (continuous) length L1 between 200 and 3000 meters inclusive,
- an envelope 1 (referred to above as the coated textile structure) that is impermeable to the liquid transported and at least two peripheral reinforcing elements (reinforcing tapes 5a, 5b that are watertight or not), increasing the mechanical resistance of the pipe to a positive differential pressure (exterior overpressure when immersed) and that withstands without bursting or splitting a positive differential pressure from 1 to at least 10 bar ($10 \times 10^5$ Pa).

Given the recommended construction, the envelope 1 and the reinforcing elements 5a, 5b will therefore favourably be made of at least one thermoplastic material such as polyolefin plastomers, preferably of LLDPE type, metallocenes with chains of eight carbon atoms or polyurethane plastomers or "controlled nanocrystalline structure elastomer", reinforced by the filaments 3, 8, such that the pipe will therefore favourably include, in section, from the interior toward the exterior, within the thermoplastic material:
- a first textile layer 1 of knitted, braided, woven or non-woven structure 2, including longitudinal filaments 30 parallel to the longitudinal axis 110 of the pipe, then, around said first textile layer (1) and within the thermoplastic material (the same one or another one intimately joined to the first, typically as a result of them fusing together),
- at least one second then one third coated textile layers 5a, 5b, respectively, each:
  - of knitted, braided, woven, non-woven or unidirectional structure 50,
  - wound longitudinally in a helix along the axis of the pipe, and
  - including longitudinal filaments 8 parallel to the generatrix of the helix.

If it exists, the zone 111 in which the thermoplastic material is overlapped on itself produced when the initial strip of material is formed to a round shape will therefore be formed substantially at the location of the diameter of the pipe (see radial zone or portion 112, FIGS. 5a, 6) at which the first textile layer 1 is situated. Once the pipe has been manufactured, and therefore the concentric layers of thermoplastic material(s) welded to one another, an overthickness (or an edge mark) could still appear on the interior surface, as shown diagrammatically in FIG. 3b, in the zone 111.

For a compromise between flexibility, resistance to pressure and flowrate, the diameter D1 will favourably be between 1 and 5 meters inclusive.

As for the length L1, it is therefore recommended that it be between 300 and 1000 meters inclusive. The technique of manufacture by winding around a central mandrel allows this.

To combine mechanical strength/speed of manufacture/limited weight, it is further recommended that, on this pipe:
- the denier of the longitudinal filaments 3, 8 is between 200 and 8500 Tex inclusive, and
- the number of these longitudinal filaments is less than three filaments per cm.

The pressure resistance that should be achieved in service, for possible underwater immersion at a depth of more than 100 meters, to ensure the physical integrity of the pipe, without bursting, proposes that the pipe withstand a bursting pressure preferably up to between 20 and 30×10⁵ Pa inclusive.

Given these operational conditions for laying in an underwater environment, with longitudinal and/or lateral curvature to be provided, it is recommended that the mass per linear meter of the wall 10 of the pipe 11 is between 14 kg/ml and 320 kg/ml inclusive, depending on the diameter and the bursting pressure, and preferably between 14 kg/ml and 175 kg/ml inclusive.

It is also recommended that the tubular wall 10 have a thickness E (FIG. 3*b*) between 6 and 17 millimeters inclusive, depending on the diameter and the bursting pressure.

For the operational mechanical strength, it is also recommended that the wall 10 respects the following inequality:

$$\frac{T}{P} \leq \mu, \pi, R^2 \text{ with}: \mu = 0.9$$

T: axial breaking tension at zero differential pressure(Pi−Pe),

P: bursting differential pressure (Pi−Pe) therefore with Pi: internal pressure of the pipe and Pe: external pressure;

R: inside radius R1 (FIG. 3*b*) of the pipe under positive differential pressure (internal pressure greater than exterior pressure).

Respecting some or all of the technical characteristics of this pipe is aimed at it being, without its functionalities, bursting pressure and axial breaking tension under zero differential pressure being affected:

deformable between a circular internal section and a flattened internal section in which two opposite zones of the internal perimeter touch each other, and foldable on itself longitudinally to form a flattened strip having, at the location of the folds, a radius of curvature less than or equal to 50 cm, without the bursting pressure or the axial breaking tension under zero differential pressure of the pipe being modified more than 5%, neither by the passage from the circular internal section to the flattened internal section and vice versa, and nor by the folding of the pipe longitudinally on itself to form said flattened strip and unfolding it flat.

FIG. 8*a*, there is seen a length of the pipe 11 wound around the drum 15, flat or in a state immediately close to such a flat state, not folded on itself perpendicularly to its longitudinal axis 110, the drum having a width 12 oriented perpendicularly to the longitudinal axis of said length of pipe, this width being greater than the half-perimeter of the pipe in a circular state of the section of this pipe.

To limit the overall size, it may however be preferable for the longitudinal dimensions 11*a*, 11*b* of the empty pipe 11, (substantially) flattened for its storage, to be folded one toward the other, like a wallet, as shown in FIG. 8*b*, therefore preventing the structure of the pipe from being crushed completely flat. The drum will then have (parallel to the rotation axis 150) a width 12' preferably less than the half-perimeter of the pipe in the circular state of the section of this pipe.

To wind or unwind the pipe, the drum turns on itself about an axis 150 perpendicular to the longitudinal axis 110 of the pipe.

FIG. 9, there is now seen a length of the pipe 11 and a container 16 in which the pipe is accordion-folded and stored.

As for FIG. 10, it shows a plurality of pipes 11 or pipe lengths butt-jointed two by two at the location of a welding area 17 where at least some of the thermoplastic materials of the pipes (pipe lengths) are fused. The zone 17 will preferably define a butt-jointing zone with longitudinal overlapping of the ends of the lengths of pipe one by the other, over a distance varying according to circumstances, typically from 50 cm to 2 m.

By way of the advantages of or the problems solved by the pipe described above and considered in accordance with some of all of its features, it will further be noted that:

the pipe 11 is a pipe of large diameter, it can be manufactured in diameters never achieved before (4 meters and more), it can be manufactured at reasonable cost with peripheral wall thicknesses to resist internal pressures up to 30×10⁵ Pa, it is made of composite products, flexible and crushable on itself without damage.

Because of this last property it is possible to transport the pipe to the installation site without taking up a lot of room, which reduces transportation costs.

Moreover, more generally:

the pipe inserted in a water transport system (canal, rigid pipe, etc.) will not suffer from negative ramming generated by untimely stopping of the dispatch pump (that causes the liquid to circulate in the pipe), whereas a tube of rigid section runs the risk of being crushed on itself plastically, or even destructively, therefore leading to irreparable damage to its structure. To resist negative ramming, a tube of rigid section must employ thicknesses of material incompatible with the economics of a fresh water transport project, the length to be laid of these fresh water transport pipes is measured in hundreds or even thousands of kilometers. To install such lines within reasonable timescales, the pipe must be manufactured at a very high rate, from 5 to 10 km/day. The multilayer helix structure makes it possible to distribute the production of the components of the assembly between different sites producing the components and reduces the duration of the assembly phase, at the same time as ensuring an appropriate mechanical strength (see above), to lay the pipe at sea in reasonable timescales, it is necessary to minimize the number of welds to be carried out on site, at sea, on the ship(s). The individual length of each manufactured segment makes it possible to constitute lengths of several segments onboard the installation boat and makes it possible to reduce this number of welds and to accelerate the rate of laying up to values of 6 to 8 km/day for a tube of 4 m diameter. This results in a high rhythm of installation compared to existing laying techniques (typically around 10 meters).

The invention claimed is:

1. A flexible pipe elongate along an axis, adapted to transport fresh water, able to be wound longitudinally on a drum or folded in a container, longitudinally continuous, of circular section when there is a positive differential pressure between the interior of the pipe and the exterior, the section of which can be crushed on itself by the effect of a negative differential pressure, the pipe having an outside diameter (D1) between 1 and 7 meters and comprising an envelope impermeable to the transported liquid, wherein the pipe has a length (L1) between 200 and 3000 meters and comprises at least two peripheral reinforcing elements increasing the mechanical strength of the pipe relative to a positive differential pressure and the pipe withstands without bursting or splitting a positive differential pressure from 1 to at least $10 \times 10^5$ Pa, wherein the envelope and the reinforcing elements are made from at least one thermoplastic material reinforced with filaments so that the pipe includes, in section, from the interior toward the exterior, within the thermoplastic material a first textile layer of knitted, braided, woven or non-woven structure, having longitudinal filaments parallel to the longitudinal axis of the pipe, then, around said first textile layer, at least one second then one third textile layers each having a knitted, braided, woven, non-woven or unidirectional structure, being wound longitudinally in a helix along the axis of the pipe, and including embedded longitudinal filaments parallel to the generatrix of the helix.

2. The pipe according to claim 1 having a diameter (D1) between 1 and 5 meters.

3. The pipe according to claim 1 having a length (L1) between 300 and 1000 meters.

4. The pipe according to claim 1, having a mass per linear meter between 14 kg/ml and 320 kg/ml.

5. The pipe according to claim 1, having a tubular wall with a thickness between 6 and 17 millimeters.

6. The pipe according to claim 1, wherein the pipe satisfies the following inequality:

$$\frac{T}{P} \leq \mu \pi R^2$$

with: $\mu = 0.9$

T: axial breaking tension at zero differential pressure,
P: bursting differential pressure between the interior and the exterior of the pipe,
R: inside radius of the pipe under positive differential pressure.

7. The pipe according to claim 1 having a bursting pressure between 3 and $30 \times 10^5$ Pa.

8. The pipe according to claim 1 wherein the pipe is configured to be deformable between a circular internal section and a flattened internal section in which two opposite zones of the internal perimeter touch each other, and foldable on itself longitudinally to form a flattened strip having, at the location of the folds, a radius of curvature less than or equal to 50 cm, without the bursting pressure or the axial breaking tension under zero differential pressure of the pipe being modified more than 5%, by the passage from the circular internal section to the flattened internal section and vice versa, and by the folding of the pipe longitudinally on itself to form said flattened strip and unfolding it flat.

9. The pipe according to claim 1, wherein the denier of the longitudinal filaments is between 200 and 8500 Tex, and the number of longitudinal filaments is less than three filaments per cm.

10. The pipe according to claim 1, wherein, substantially at the location of the diameter at which the first textile layer is situated, the first textile layer includes a zone in which the thermoplastic material is overlapped on itself.

11. A system comprising:
a length of the pipe according to claim 1, and
a drum around which the length is wound, substantially flat and not folded on itself perpendicularly to its longitudinal axis, the drum having a width oriented perpendicularly to the longitudinal axis of the length of pipe, with the width being greater than a half-perimeter of the pipe in a circular state of a section of the pipe.

12. A system comprising:
a length of the pipe according to claim 1, and
a drum around which the length is wound, with its section flattened, folded on itself perpendicularly to its longitudinal axis, the drum having a width oriented perpendicularly to the longitudinal axis of the length of pipe, with the width being less than a half-perimeter of the pipe in a circular state of a section of the pipe.

13. A system comprising a length of the pipe according to claim 1, and a container in which the pipe is accordion-folded.

14. The assembly of a plurality of pipes according to claim 1 butt-jointed two by two at a location of a welding zone where at least some of the thermoplastic materials of the pipes are fused.

* * * * *